United States Patent Office 3,161,599
Patented Dec. 15, 1964

3,161,599
METHOD OF REMOVING RADIOACTIVE PRODUCTS FROM AN ORGANIC MODERATOR-COOLANT USED IN A NUCLEAR REACTOR
James F. Black, Convent, N.J., assignor to Esso Research and Engineering Company, a corporation of Delaware
No Drawing. Filed Apr. 16, 1962, Ser. No. 187,953
8 Claims. (Cl. 252—301.1)

The present invention relates to a method of moderating a nuclear reactor with high sulfur moderator liquid. It has particular application to the operation of atomic or nuclear reactors wherein an organic moderator-coolant such as selected petroleum fractions of suitable chemical structure but of high sulfur contents are employed. The process makes possible the use of moderator-coolants which may have sulfur contents as high as 1% by weight or more.

In the operation of atomic reactors, sulfur is quite readily converted into highly radioactive and dangerous materials such as $S^{35}$ and $P^{32}$. The impact of slow or thermal neutrons on $S^{34}$ readily converts a small amount of the sulfur to $S^{35}$. This conversion is accompanied by emission of gamma rays which may range in energy from about 2.94 to 8.64 mev. Even the weakest of these will produce a recoil energy of 133 electron volts in an $S^{35}$ atom. This energy is far higher than that of the strongest chemical bond and results in the sulfur atom being ejected from molecules such as thiophenes which contain the sulfur. Ring-type materials like thiophene are ordinarily extremely resistant to chemical attack and are difficult to remove without repeated and expensive treatments.

Likewise, sulfur such as $S^{32}$ may be converted to $P^{32}$ by fast neutron capture accompanied by a heavy particle (proton) emission. This reaction, of course, results in a change in valence. Elemental phosphorus so produced, or the phosphine linkages which are the most likely ones to result in a hydrocarbon, is readily subject to chemical attack.

Hence the present invention is based on the discovery that the highly chemically reactive as well as radioactive $S^{35}$ and $P^{32}$ may be contacted with a material which will facilitate very nearly complete removal of the dangerous materials from the moderator-coolant liquid. Moreover, this reduction may be accomplished in such a manner as to make the radioactive materials easily disposable.

A suitable moderator-coolant of the type mentioned above is, for example, a cycle stock extract derived from by-products of catalytic cracking of gas oil to produce gasoline and similar hydrocarbon fractions. To reduce sulfur in such materials to sufficiently low levels that the residues may be burned, has proved to be extremely difficult and expensive. For example, a cycle stock of generally suitable characteristics containing about 1% sulfur, was treated by passing it five times through severe hydrofining conditions in an attempt to reduce the sulfur content to a level of 100 parts per million. It was found, however, that the best that could be done in five passes was to reach a level of 140 parts per million, which will not meet the specifications imposed on moderator-coolants derived from petroleum.

The purpose of the specification is to prevent atmospheric pollution which is likely to occur when separated residues from moderator-coolants are finally disposed of. Attempts have been made to separate relatively large fractions of the circulating moderator-coolant and to dispose of them by storing in safe containers for a while and ultimately burning. According to the present invention, the harmful radioactive conversion products of sulfur can be concentrated to a vastly greater degree and then may easily be disposed of by placing the concentrates in suitable containers and burying them or dropping them off the Continental Shelf in the ocean.

As an example, a petroleum fraction consisting principally of high boiling aromatic hydrocarbons as contained in cycle stock, is used as a moderator-coolant in a nuclear reactor. This particular fraction had a sulfur content of approximately 1% by weight. As a result of the thermal and radiation effects within the reactor, some high boiling polymeric materials are produced as well as some quantities of low molecular weight gases. This whole stream may be treated as described below, but it is usually simpler to withdraw a side stream of the circulating coolant. This side stream is subjected to suitable separation treatments, preferably distillation, to remove the polymer. In lieu of distillation however, solvent separating or precipitation means such as are used for deasphalting petroleum fractions may be employed. The polymer-free side stream may then be returned to the reactor, sufficient new moderator-coolant being added to make up for the material removed.

Prior to distillation or after separation of the polymer by distillation, the full stream, side stream, or the separated polymer which contains the bulk of the radioactive material, is contacted with a strongly basic material. A preferred material is sodium hydroxide absorbed on asbestos, through which the stream is passed. The highly reactive $S^{35}$ and $P^{32}$ react, preferentially with the strong base, and combine chemically therewith. In lieu of NaOH on asbestos, a strong caustic solution may be used, or finely divided metallic sodium on a suitable support.

As a result of the treatment described above, radioactive sulfur $S^{35}$ in a side stream prior to distillation is reduced from a level of about 2 millicuries per cc., down to a level of about 0.01 microcuries per cc. This is a reduction to approximately one part in 200,000. Likewise, the radioactive phosphorus $P^{32}$ originally at a level of about 5.57 millicuries per cc., is reduced to a level of approximately 0.01 microcuries per cc., a reduction to approximately one part in 500,000. These contamination levels resulted from exposure of the organic material to a fast neutron flux of about $10^{14}$ neutrons per square centimeter per second, and a thermal neutron flux (resulting in production of $S^{35}$) of approximately 5 times as great, that is, $5 \times 10^{14}$ thermal or slow neutrons per square centimeter per second. These concentrations are reached after about ten days' average lifetime in the operating reactor.

By removing the relatively very small proportions of reaction products of the radioactive sulfur and phosphorus with the strong base, the overall sulfur content of the moderator-coolant or even of the high boiling residue to which the treatment may be applied, is not substantially reduced. In other words, no attempt is made to remove a substantial portion of the sulfur, but the highly reactive and dangerous radioactive materials are quite fully and completely removed. Obviously this makes possible the use of moderator-coolants which hitherto could not be safely employed, particularly in populated areas when residue must be disposed of.

It will be appreciated that the full stream circulating through the moderator may be contacted with metallic sodium, sodium hydroxide or other strong alkali-base, or that only a side stream may be so treated. As noted above also, the contacting may apply to the whole stream, or side stream, or only to the high molecular weight polymer after the latter has been separated by a suitable conventional process.

The radioactive reject products, presumably including $NaS_2$, sodium phosphate, and related materials, can be placed in metallic containers where they are reasonably safe, and for greater safety can be buried or disposed of at sea as previously mentioned. The half-life of these products extends for some weeks or months, but they become relatively inactive and relatively safe after a year or so.

It will be obvious that the invention can be modified in various ways, and that other reactive materials such as the other alkali metals or their oxides or hydroxides may be employed to take up the dangerous radioactive by-products, and facilitate their disposition as reject products. This radioactive content of the circulating fluid remaining in the reactor is usually of minor concern. The radioactive content of the heavy polymer which is being removed from the circulating fluid can be a serious problem, however, since it will affect the methods which can be adopted for disposal of this material. This invention is particularly concerned with procedures for producing heavy polymer waste which is low in radioactive content.

What is claimed is:

1. The method of removing radioactive $S^{35}$ and $P^{32}$ containing material from a liquid aromatic hydrocarbon moderator-coolant containing sulfur substantially in excess of 100 parts per million by weight after said coolant has been exposed to nuclear radiation and thermal effects under conditions to convert sulfur $S^{34}$ atoms to radioactive $S^{35}$ atoms and $S^{32}$ atoms to $P^{32}$ atoms in said coolant, while a portion of the aromatic hydrocarbons in the liquid coolant is polymerized, which comprises contacting the polymer in said liquid coolant after exposure to nuclear radiation with a strongly basic alkali metal-containing material and reacting said basic material with the radioactive $S^{35}$ and $P^{32}$ containing material in said polymer to separate said radioactive material thus reacted and concentrate said radioactive material into a relatively small volume with the reacted basic material as a reject product prior to discard of the polymer from which said radioactive material has been separated.

2. The method according to claim 1, wherein a portion of the liquid aromatic hydrocarbon coolant containing the polymer and the radioactive material is treated by contacting with the strongly basic material with which the radioactive $S^{35}$ and $P^{32}$ containing material followed by separation of the resulting reject product from the thus treated coolant containing the polymer, and followed by removal of the polymer which has been freed of radioactive material from the liquid organic coolant.

3. The method according to claim 1, wherein the strongly basic material is an alkali metal oxide.

4. The method according to claim 1, wherein the strongly basic material is an alkali metal hydroxide.

5. The method according to claim 1, in which the strongly basic material is adsorbed on an asbestos support through which a stream of the liquid coolant containing polymer and the radioactive material is passed in the contacting and reaction of the radioactive material with the strongly basic material.

6. The method according to claim 1, wherein a portion of the aromatic hydrocarbon coolant containing the polymer and associated radioactive material which contains $S^{35}$ and $P^{32}$ atoms is distilled to remove the liquid aromatic hydrocarbon coolant from a residue of the polymer and said associated radioactive material, said residue being contacted with the strongly basic material for the reaction of the radioactive material with the strongly basic material as the polymer is withdrawn from the resulting reject product to be discarded.

7. The method according to claim 1, in which the polymer with associated radioactive material containing $S^{35}$ and $P^{32}$ is precipitated from the aromatic hydrocarbon coolant, and then separated from the aromatic hydrocarbon coolant to be contacted with the strongly basic material with which the radioactive material is located.

8. The process for separating and concentrating radioactive products formed in a liquid aromatic extract of a catalytically cracked petroleum gas oil cycle stock which contains sulfur in thiophenes, a portion of said sulfur having been converted to a radioactive $S^{35}$ and $P^{32}$ containing product and a portion of said liquid having been polymerized by thermal and radiation effects of nuclear radiation to a polymer, which comprises contacting at least a portion of the liquid coolant containing the polymer and the radioactive product with a strongly basic alkali metal-containing material that reacts with the radioactive product in the contacting to form a reject product in which the radioactive products reacted with the strongly basic material are concentrated, and separating the remaining liquid containing the polymer thus freed of the radioactive product.

References Cited in the file of this patent

UNITED STATES PATENTS

| 2,164,851 | Yabroff | July 4, 1939 |
| 2,883,331 | Bolt et al. | Apr. 21, 1959 |
| 2,909,488 | Colickman | Oct. 20, 1959 |